United States Patent
Bai et al.

(10) Patent No.: US 8,369,425 B2
(45) Date of Patent: Feb. 5, 2013

(54) ROBUST CHANNEL ESTIMATION IN COMMUNICATION SYSTEMS

(75) Inventors: Ziquan Bai, Beijing (CN); Hong Wei Kong, Beijing (CN); Honggang Zhang, Beijing (CN); Ya Jing, Beijing (CN); Xu Zhao, Beijing (CN); Danxun Shen, Beijing (CN)

(73) Assignee: Agilent Technologies, Inc., Santa Clara, CA (US)

( * ) Notice: Subject to any disclaimer, the term of this patent is extended or adjusted under 35 U.S.C. 154(b) by 1157 days.

(21) Appl. No.: 12/054,028

(22) Filed: Mar. 24, 2008

(65) Prior Publication Data

US 2008/0310531 A1   Dec. 18, 2008

(30) Foreign Application Priority Data

Jun. 15, 2007   (CN) .......................... 2007 1 0106742

(51) Int. Cl.
*H04K 1/10* (2006.01)
(52) U.S. Cl. ....................................................... 375/260
(58) Field of Classification Search .................. 370/329; 375/260, 267, 322
See application file for complete search history.

(56) References Cited

U.S. PATENT DOCUMENTS

| | | | | |
|---|---|---|---|---|
| 6,690,719 B1 * | 2/2004 | Raphaeli et al. | ............... | 375/222 |
| 2004/0039973 A1 * | 2/2004 | Bub | ............................... | 714/701 |
| 2006/0269007 A1 * | 11/2006 | Zhang et al. | ................... | 375/260 |
| 2008/0170560 A1 * | 7/2008 | Im et al. | ......................... | 370/350 |
| 2009/0028106 A1 * | 1/2009 | Hansen et al. | ................. | 370/329 |
| 2009/0034644 A1 * | 2/2009 | Sandhu | .......................... | 375/267 |
| 2009/0262864 A1 * | 10/2009 | Liu et al. | ....................... | 375/322 |

OTHER PUBLICATIONS

Office Action mailed Mar. 12, 2012 for Chinese Application No. CN1870465.

* cited by examiner

*Primary Examiner* — Leon-Viet Nguyen

(57) ABSTRACT

An apparatus for archiving robust channel estimation in a communication system includes a training sequence generator to generate a training sequence. A formatter inserts the training sequence to a frame. A transmitting module is employed to transmit the frame. The training sequence generator further includes a symbol generator to generate a plurality of training symbols satisfying a predetermined constraint such that the training symbols are insensitive to synchronization error and a training sequence forming unit that forms the training sequence from the training symbols generated by the training symbol generator.

10 Claims, 9 Drawing Sheets

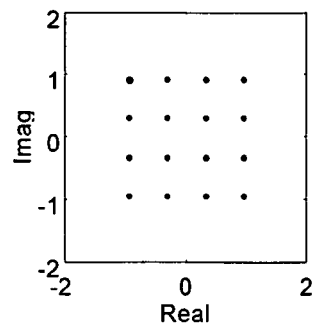
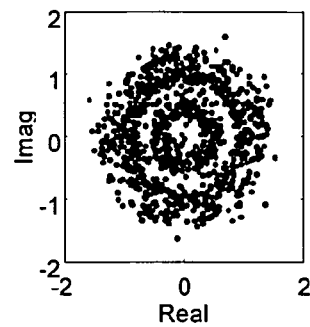
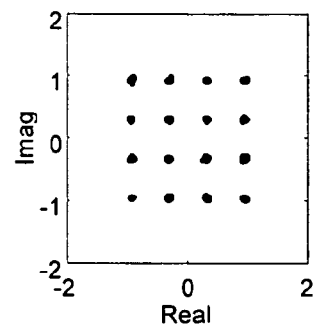
Fig.13A    Fig.13B    Fig.13C
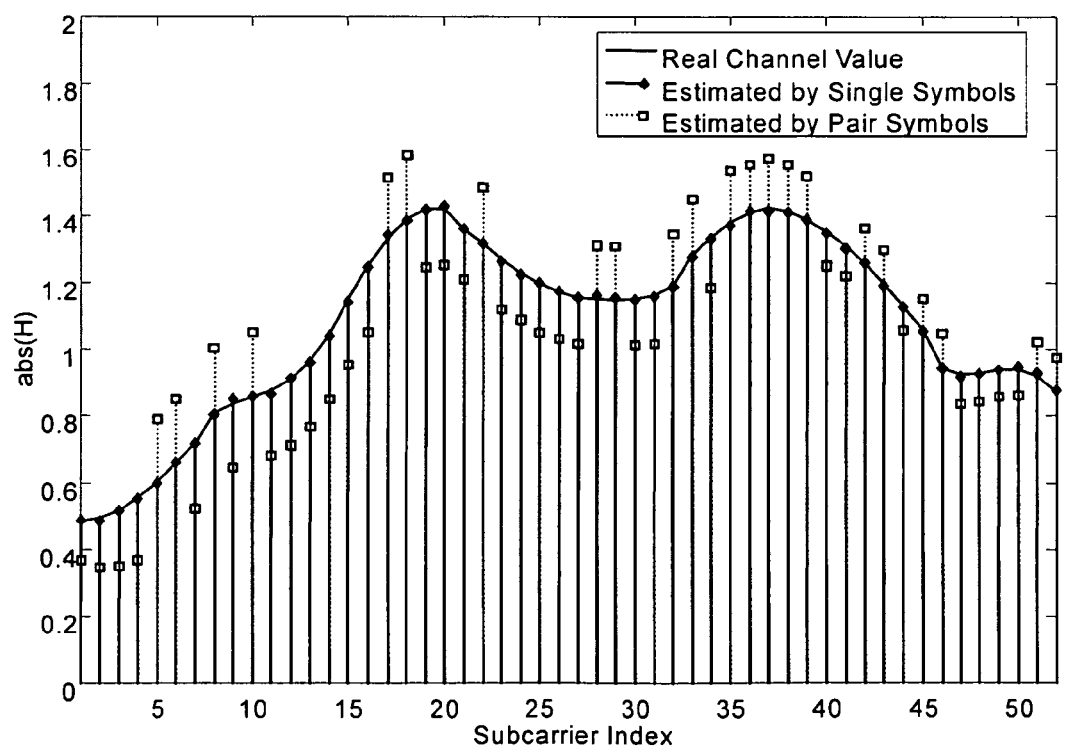
Fig. 14

ROBUST CHANNEL ESTIMATION IN COMMUNICATION SYSTEMS

FIELD OF THE INVENTION

The technical field of the present invention relates generally to wireless communication and more particularly to generation and use of training sequences in channel estimation of communication systems

BACKGROUND

In wireless communication, OFDM (Orthogonal Frequency Division Multiplexing) has been viewed as a popular technical solution with high spectrum efficiency for realizing high data rate, especially in 4G (4th Generation) wireless communication systems, because of its effective use of frequency band and simple implementation. Typically in an OFDM system, available bandwidth is divided into a number of discrete channels, which are overlapping and orthogonal to each other. Each discrete channel is defined as a subcarrier and has a well-defined frequency. Each subcarrier carries modulated symbols, the amplitude and/or phase of which represent encoded information. At receiver end, received OFDM symbols can be demodulated only after the starting time of each OFDM symbol is identified. Therefore, time synchronization is required to identify the timing of the symbol. However, synchronization error exists due to channel fading, interference, noise and so on.

There are two kinds of synchronization error, early synchronization error and late synchronization error. The impacts of the early synchronization error to subsequent blocks can be ignored as long as the estimated starting time lies in the range of cyclic prefix of the symbol. The late synchronization error is more harmful than the early synchronization error, as there is no effective protection provided against this kind of synchronization error.

In practice, the estimated symbol starting time is typically shifted backwards a certain amount within the cyclic prefix to reduce the probability of the late synchronization error. However, for an OFDM system with multi-path fading channel, the late synchronization error is more likely to occur. This is due to the fact that the starting time of the signal transmitted through the strongest path (rather than the starting time of the signal transmitted through the weaker path with the smallest propagation delay) is typically taken as the starting time of the received symbol for time synchronization. Thus, the above-mentioned method of shifting the estimated symbol starting time can provide little help in this situation, because the strongest path may have much larger propagation delay than the first path.

In order to avoid the above-mentioned problem, prior solutions focus on special designed training sequences in the preamble field or longer cyclic prefix. However, such solutions are disadvantageous in that modification of the format of preamble field or data field is needed and the modification may have conflict with specifications in communication standards.

Another prior solution focuses on joint synchronization and channel estimation. Joint estimation can obtain more accurate result than separate estimation, but the computation complexity of joint estimation is much more than that of separate estimation. More complexity results in higher cost. An improved joint estimation is proposed to improve channel estimation by weighted averaging multiple training sequences based on estimated power of interference. But, in the system with the late synchronization error, all the received training sequences involve great interference, and therefore, the method of weighted averaging will not bring improvement.

MIMO (Multiple Input Multiple Output) OFDM system is more sensitive to synchronization error than SISO (Single Input Single Output) OFDM system, because synchronization error in one receiver can not only introduce interference to it own but also confuse other receivers. Because there are different timing offsets between multiple transmitters and a single receiver, ideal synchronization or early synchronization for signal from one transmitter often becomes late synchronization for signal from another transmitter. So synchronization error is difficult to avoid in MIMO OFDM system even if the clocks of some transmitter and receiver are perfectly synchronized.

SUMMARY

An apparatus for archiving robust channel estimation in a communication system includes a training sequence generator to generate a training sequence. A formatter inserts the training sequence to a frame. A transmitting module is employed to transmit the frame. The training sequence generator further includes a symbol generator to generate a plurality of training symbols satisfying a predetermined constraint such that the training symbols are insensitive to synchronization error and a training sequence forming unit that forms the training sequence from the training symbols generated by the training symbol generator.

BRIEF DESCRIPTIONS OF THE DRAWINGS

The present invention will be better understood from the following detailed description of the preferred embodiments of the invention, taken in conjunction with the accompanying drawings in which like reference numerals refer to like parts and in which:

FIG. 11 is a diagram illustrating an example of traditional training sequences used for a MIMO OFDM system;

FIG. 12 is a diagram illustrating an example of the training sequences used for a MIMO OFDM system according to one embodiment of the invention;

FIG. 13A is a diagram illustrating a constellation of the transmitted symbols;

FIG. 13B is a diagram illustrating the received symbols obtained by using traditional training sequences;

FIG. 13C is a diagram illustrating the received symbols obtained by using the training sequences generated in accordance with one embodiment of the present invention;

FIG. 14 is a diagram illustrating the results of the channel estimation by using traditional training sequences and by using the training sequences generated according to the invention.

DETAILED DESCRIPTION

Figure 1:
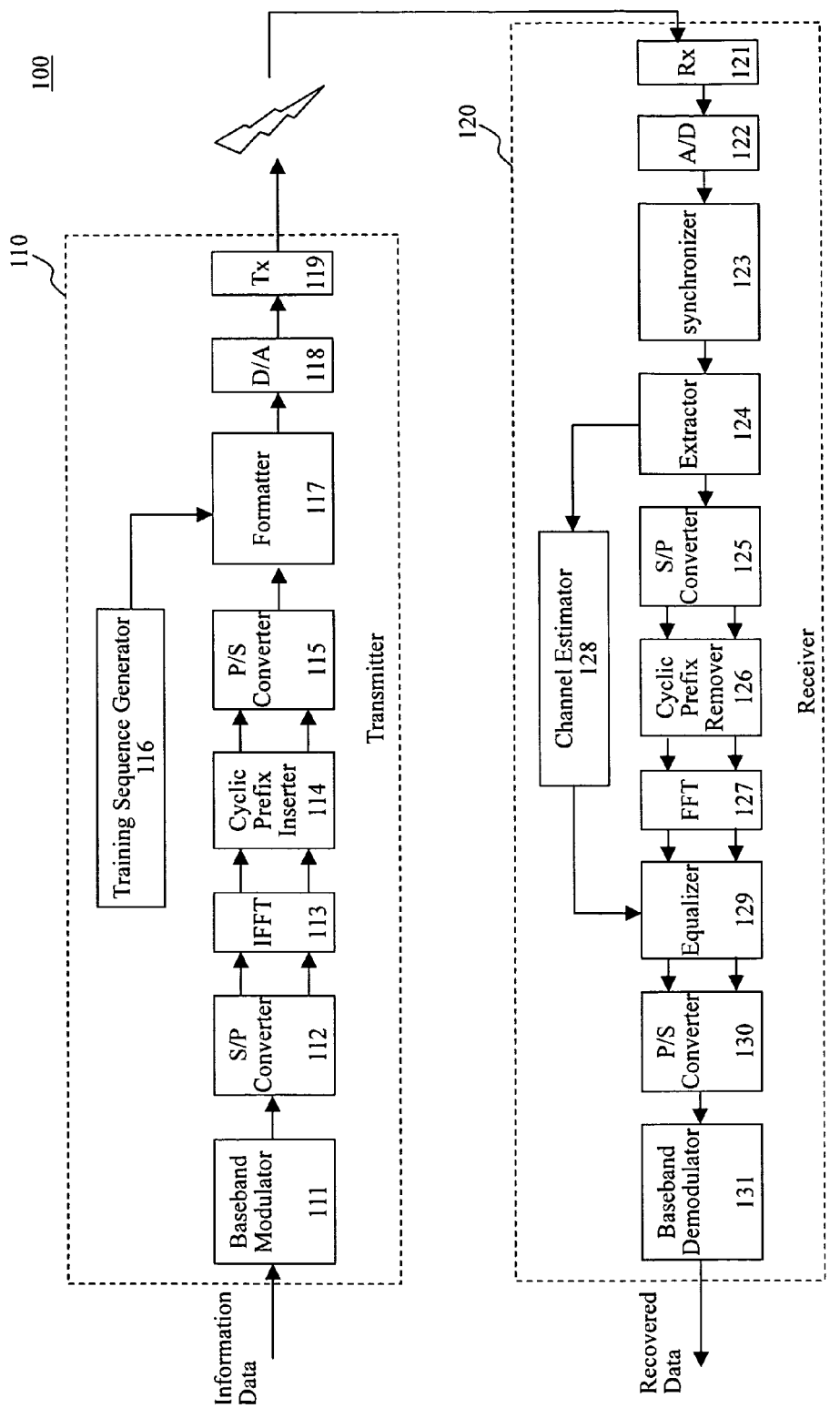
FIG. 1 is a block diagram illustrating the configuration of an OFDM system that implements one embodiment of the invention, wherein the OFDM system includes a training sequence generator and a channel estimator.

FIG. 1 is a block diagram schematically illustrating the configuration of an OFDM system 100 that implements one embodiment of the invention. Alternatively, other types of communication systems can also implement embodiments of the present invention. As shown in FIG. 1, the OFDM system 100 includes a transmitter 110 and a receiver 120 for wireless communication. Although only one transmitter and one receiver are shown in the FIG. 1, the OFDM system 100 may includes arbitrary number of transmitters and receivers.

The transmitter 110 in OFDM system 100 includes a baseband modulator 111, a serial-to-parallel (S/P) converter 112, an IFFT (Inverse Fast Fourier Transform) module 113, a cyclic prefix inserter 114, a parallel-to-serial (P/S) converter 115, a training sequence generator 116, a formatter 117, a digital-to-analog (D/A) converter 118, and an antenna (Tx) 119.

The information bits to be delivered to the receiver 120 via the transmitter 110 are firstly inputted to the baseband modulator 111 of the transmitter 110. The baseband modulator 111 performs baseband digital modulation (e.g., source coding, interleaving, QPSK/QAM mapping and so on) on the information bits, and provides the output serial information symbols to the S/P converter 112.

The S/P converter 112 converts the inputted serial information symbols to multiple parallel symbols according to the number of the subcarriers, and provides the parallel symbols to the IFFT module 113. The IFFT module 113 performs inverse fast Fourier transform on the inputted parallel symbols to obtain parallel OFDM symbols, and outputs the parallel OFDM symbols to the cyclic prefix inserter 114. The cyclic prefix inserter 114 adds cyclic prefix to each of the OFDM symbols and outputs the OFDM symbols (with the cyclic prefixes added or incorporated) to the P/S converter 115. The P/S converter 115 converts the inputted parallel OFDM symbols into a serial OFDM symbol sequence. The above processes performed within the S/P converter 112 to the P/S converter 115 are known as OFDM modulation and can be done using any known OFDM modulation means. Thus, the structure and functions of the modules 112-115 will not be described in more detail below.

In providing training sequence for channel estimation, the OFDM system 100 generates and inserts a predetermined training sequence into a frame. The OFDM system 100 accomplishes this by using the training sequence generator 116 to generate the training sequences. Each of the sequences includes a set of specially designed training symbols. Both the training sequence generator 116 and the P/S converter 115 are coupled to the formatter 117. In accordance with a prescribed format of the frame (i.e., the format defined according to the communication standard adopted by the communication system 100), the formatter 117 combines the OFDM symbols provided from the P/S converter 115, the training sequence provided from the training sequence generator 116 and any other required data to form a frame to be transmitted. According to one embodiment of the invention, the training sequence is inserted in a preamble portion of the frame, and the OFDM symbol sequence provided from the P/S converter 115 is inserted into a payload field of the frame. In an alternative embodiment of the invention, the training sequence is inserted into the payload field of the frame.

After forming the frame with the training sequence, the formatter 117 provides the frame to be transmitted to the D/A converter 118. The frame is converted by the D/A converter 118 to analog signals, and then transmitted to the receiver 120 via the antenna Tx 119. The D/A converter 118 and the antenna Tx 119 can be put together as a transmitting module. The structure and functions of these modules 118-119 are known and will not be described in more detail below.

The configuration of and the processes performed in the receiver 120 are described below, together with reference to FIG. 1. As shown in FIG. 1, the receiver 120 includes an antenna Rx 121, an analog-to-digital (A/D) converter 122, a synchronizer 123, an extractor 124, a serial-to-parallel (S/P) converter 125, a cyclic prefix remover 126, a FFT (Fast Fourier Transform) module 127, a channel estimator 128, a equalizer 129, a parallel-to-serial (P/S) converter 130, and a baseband demodulator 131.

The signals transmitted from the transmitter 110 are received by the antenna Rx 121 in the receiver 120. The received signals are then converted to a digital burst by the A/D converter 122 and then provided to the synchronizer 123. The synchronizer 123 performs time synchronization and frame synchronization on the burst to recover the transmitted frame, and provides the recovered frame to the extractor 124. The extractor 124 extracts the training sequence from the frame, and provides the extracted training sequence to the channel estimator 128. Since the pattern of the original training sequence is predetermined and known by the receiver, the channel estimator 128 may perform channel estimation with the received training sequence. The result of the channel estimation can be used for many purposes. In the example shown in FIG. 1, the result of the channel estimation is provided from the channel estimator 128 to the equalizer 129 for channel equalization.

The extractor 124 also extracts, from the recovered frame, the OFDM symbol sequence, which carries the original data, and provides the OFDM symbol sequence to the S/P converter 125. The OFDM symbol sequence is converted to parallel symbols by the S/P converter 125, and the parallel symbols are inputted to the cyclic prefix remover 126. The cyclic prefix remover 126 removes the cyclic prefix from each OFDM symbol, and provides the processed parallel OFDM symbols to the FFT module 127. The FFT module 127 performs fast Fourier transform on the inputted parallel OFDM symbols to recover the parallel information symbols, and provides the processes symbols to the equalizer 129.

The equalizer 129 performs channel equalization on the inputted information symbols by using the result provided from the channel estimator 128, and provides the equalized information symbols to the P/S converter 130. The P/S converter 130 converts the parallel information symbols to a serial symbol sequence, and provides the symbol sequence to the baseband demodulator 131. The baseband demodulator 131 performs baseband demodulation (e.g., demapping, deinterleaving, decoding, and so on) on the inputted symbol sequence to recover the original information bits. The structure and functions of the modules 121-123, 125-127, and 130-131 are known can be implemented by known means. Thus, they are not described in more detail below.

As described above, the channel estimation in the OFDM system 100 in accordance with one embodiment of the present invention is performed by employing training sequences. The characteristics of the training sequences are essential for the channel estimation.

According to one embodiment of the invention, the training sequences are generated such that they are insensitive to synchronization error. The training sequences generated according to one embodiment of the invention are different from the traditional ones and can bring several advantages in channel estimation.

Figure 2:
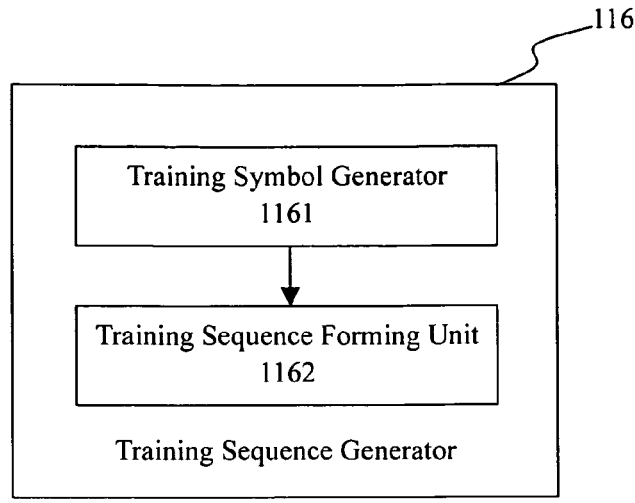
FIG. 2 is a block diagram illustrating an exemplary configuration of the training sequence generator of FIG. 1, wherein the training sequence generator further includes a training symbol generator and a training sequence formatting unit in accordance with one embodiment of the present invention.

FIG. 2 shows an exemplary configuration of the training sequence generator 116 according to one embodiment of the invention. The training sequence generator 116 mainly includes a training symbol generator 1161 and a training sequence forming unit 1162 coupled to the training symbol generator 11. The training symbol generator 1161 generates consecutive training symbols that satisfy the constraint designed according to the invention, and provides the consecutive training symbols to the training sequence forming unit 1162. The training sequence forming unit 1162 performs necessary process on the training symbols and combines the training symbols to form training sequences. For example, the training sequence forming unit 1162 adds a cyclic prefixes to each training symbol and concatenates the training symbols added with the cyclic prefix to form a training sequence.

According to this embodiment, the training symbols generator 1161 generates training symbols in the following manner: the consecutive training symbols are generated such that each symbol is a cyclic left shift version of the previous one in time domain. Assuming that the number of samples/segments in the cyclic prefix of a training symbol is $N_{CP}$, the amount of shifting is $N_{CP}$ segments of the training symbol, then it can be seen that the time domain constraint according to this embodiment can be expressed as $t_{i+1}(n)=t_i((n+N_{CP}) \bmod N)$, where $t_i(n)$ is the $n^{th}$ segment of the $i^{th}$ training symbol, N is the number of segments contained in one training symbol, and (.)mod N indicates the modulus of N.

For example, assuming the cyclic prefix of a training symbol includes only one segment, i.e., $N_{CP}=1$, and each training symbol has four consecutive segments, if the first training symbol in time domain is expressed as $\{t_1(1), t_1(2), t_1(3), t_1(4)\}$, the training symbols generator 1161 according to the embodiment of the invention generates $\{t_1(2), t_1(3), t_1(4), t_1(1)\}$ as the second training symbol, $\{t_1(3), t_1(4), t_1(1), t_1(2)\}$ as the third training symbol, and so on. The training sequence forming unit 1162 will add $t_1(4)$ to the first training symbol as the cyclic prefix, $t_1(1)$ to the second training symbol, $t_1(2)$ to the third training symbol, and so on, to form a training sequence. The time domain training sequence formed is shown in FIG. 3.

Figure 3:
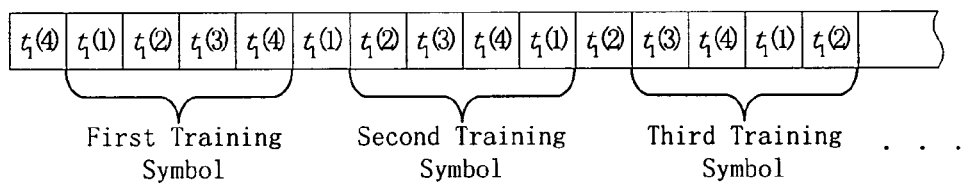
FIG. 3 is a diagram illustrating an exemplary training sequence generated by the training sequence generator of FIGS. 1-2 in accordance with one embodiment of the invention.

As can be seen from FIG. 3, the cyclic prefix $t_1(1)$ of the second training symbol is also the cyclic suffix of the first training symbol, the cyclic prefix of the third training symbol is also the cyclic suffix of the second training symbol, and so on. Cyclic prefixes of all the succeeding training symbols generated according to the embodiment of the invention have such dual functions. As a result, all the training symbols in the sequence get both cyclic prefix and cyclic suffix. It is advantageous in performing robust channel estimation as will be explained below.

Figure 4:
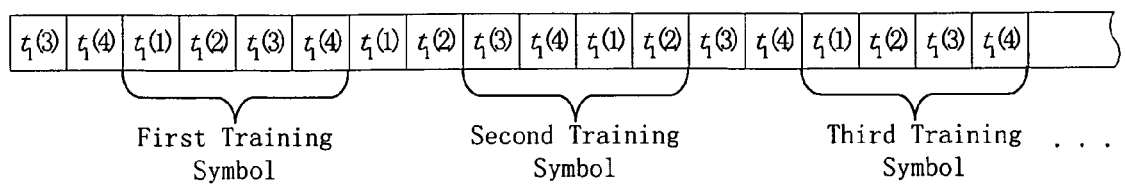
FIG. 4 is a diagram illustrating another exemplary training sequence generated by the training sequence generator of FIGS. 1-2 in accordance with one embodiment of the invention.

The sequence shown in FIG. 3 is just an example. For any other values of $N_{CP}$ and the number of the segments of a training symbol, the training sequence can be generated similarly by performing cyclic left shifting on the current training symbol to generate the next one. For example, FIG. 4 shows a training sequence generated in accordance with the invention in the case of that the cyclic prefix of a training symbol includes two segments, and each training symbol has four consecutive segments. Because each training symbol in the training sequence generated according to an embodiment of the invention is a cyclic left shift version of the previous one, the training symbol generator 1161 described above can be implemented by using a cyclic left shifter.

Figure 5:
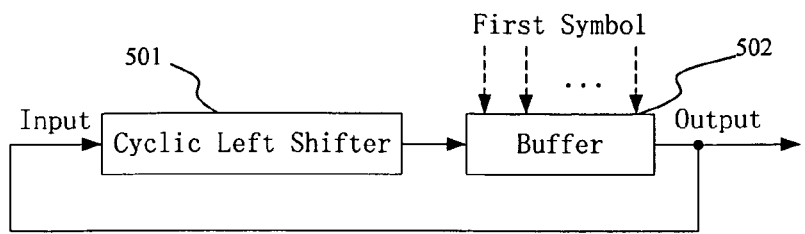
FIG. 5 is a block diagram illustrating an exemplary configuration of the training symbol generator of FIG. 2 according to one embodiment of the invention.

FIG. 5 is a diagram illustrating an exemplary configuration of the training symbol generator 1161 according to one embodiment of the invention. As shown in FIG. 5, the training symbol generator may include a cyclic left shifter 501 and an output buffer 502. The output buffer 502 is coupled to the training sequence forming unit 1162 so as to output the training symbols to the training sequence forming unit 1162 for cyclic prefix inserting and concatenating. The output buffer 502 is also coupled to the input of the cyclic left shifter 501 to feedback the current output training symbol to the cyclic left shifter 501 for generating the next training symbol. It should be noted that, the output buffer 502 is initialized with the first training symbol of the training sequence. The first training symbol may be predetermined and stored in some storage unit (not shown), or be generated by a device, such as a controller (not shown). Thereby, when initialized, the output buffer 502 of the training symbol generator 1161 may be coupled to the controller to receive the first training symbol and be filled with it. Although not shown, there may be a controller to control the operation of the training symbol generator 1161, for example, control the amount of shifting of the cyclic left shifter 501.

Figure 6:
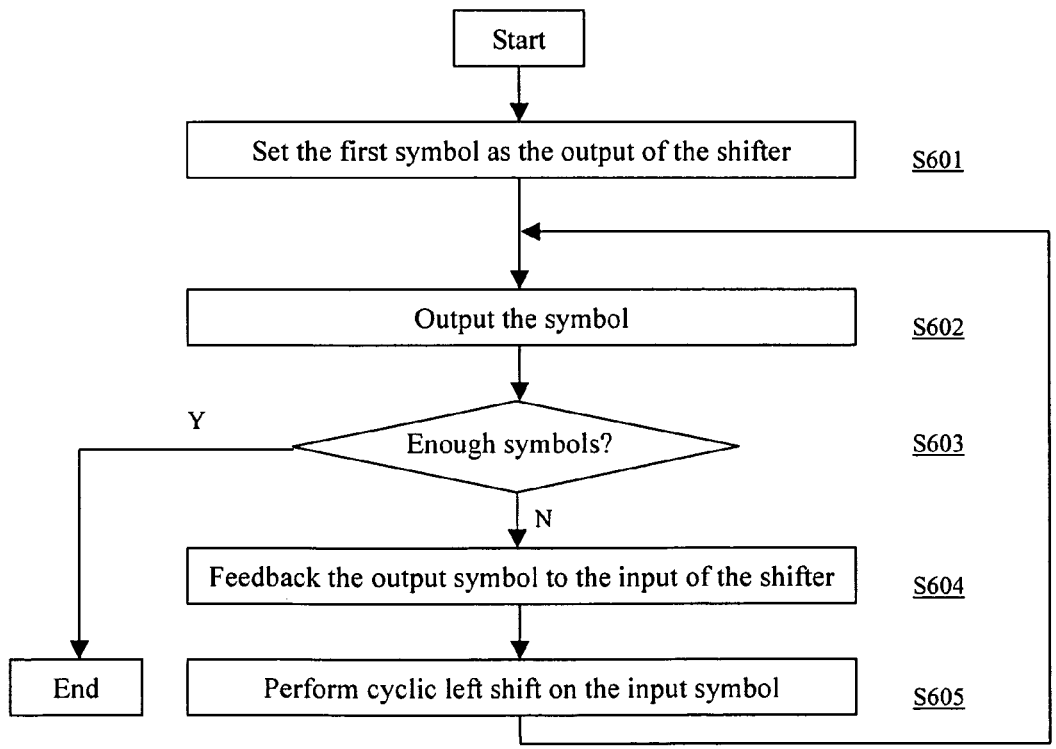
FIG. 6 is a flow char illustrating the process of generating training symbols by the training symbol generator of FIG. 2.

FIG. 6 is a flow chart illustrating the process for the training symbol generator 1161 to generate training symbols according to one embodiment of the invention. At the beginning, the initial output of the cyclic left shifter 501 is set to the first training symbol, that is, the output buffer 502 is filled with the first training symbol (step S601). Then, the symbol in the output buffer 502 is output as the first training symbol at step S602. If it is determined at step S603 that more consecutive training symbols are required, the process goes to step S604 for generating the next training symbol. At step S604, the output of the buffer 502 is feedback to the input of the cyclic left shifter 501 as the input symbol of the cyclic left shifter 501. Then, the cyclic left shifter 501 performs cyclic left shifting on the input symbol at step S605, and outputs the shifted symbol as the next training symbol at step S602. As described above, the amount of the shifting is determined according to the number of segments in the cyclic prefix of each symbol. If still more training symbols are required ("N" in step S603), the process from step S604 to S605 and to S602 is repeated. In this manner, the consecutive training symbols are generated one by one. When the number of the generated consecutive training symbols reaches what required in forming the training sequence ("Y" in step S603), the process ends.

As described above, the generated training symbols are outputted to the training sequence forming unit 1162. The training sequence forming unit 1162 adds a cyclic prefix to each training symbol, and concatenates the training symbols added with the cyclic prefix to form a training sequence. The generated training sequence is provided to, for example, the formatter 117 shown in FIG. 1 so as to be inserted into the transmitting frame.

The training sequence formed in accordance with the embodiment may be inserted into the frame, and be transmitted to the receiver in the communication system. As will be explained below, the training sequences formed in such manner are insensitive to synchronization error. Therefore, the receiver may perform robust channel estimation with such training sequences.

Figure 7:
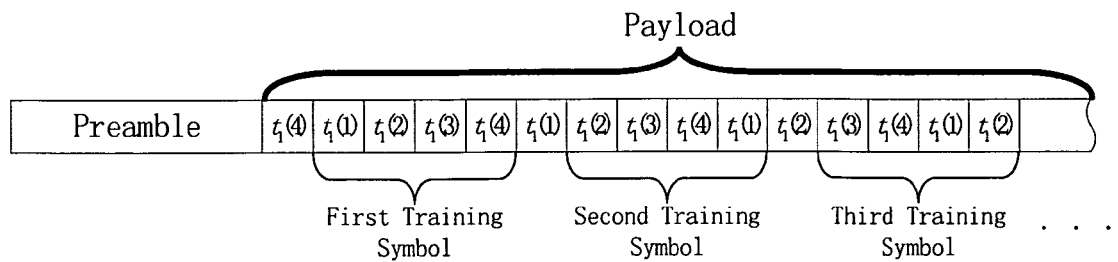
FIG. 7 is a diagram illustrating a frame in which the training sequence of FIG. 3 is inserted into a payload field according to one embodiment of the invention.

As described above, the training sequence can be inserted into the preamble field of the frame, and accordingly, the extractor 124 in the receiver 120 extracts the training sequence from the preamble field of the frame. However, the length of the preamble field is limited and relatively short in accordance with the existing standards. In an alternative embodiment of the invention, the training sequence is inserted into the payload field of the frame, which is much longer than the preamble field, as shown in FIG. 7. Therefore, it is possible to increase the length of the training sequence. With long training sequence, the precision of channel estimation can be improved since more identical symbols are available to suppress the noise.

Please note that the configuration and the processes described above are just taken as an example. The invention is not limited to any particular embodiments described above. For example, the transmitter and the receiver are not limited to the configuration shown in FIG. 1. What is shown in FIG. 1 is only a specific configuration of one kind of OFDM system in which the invention can be applied. However, as known by those skilled in the art, there may be many other kinds of OFDM systems with different configurations. For example, according to one kind of configuration, the cyclic prefix inserter 114 may be placed after the P/S converter 115. In addition, the transmitter and the receiver may include any modules or parts, which are already known or will be developed in future, to perform any other necessary processes or operations. Those skilled in the art may realize that the invention may be implemented with any modified configuration without departing from the spirit of the invention.

In addition, the training sequence generator 116 described above may also include any modules or parts, which are already known or will be developed in future, to perform any other necessary processes or operations. For example, the training sequence generator 116 may further include a buffer or memory for temporarily storing the operation data or setting data, and a controller that controls the operation of each part of the training sequence generator, and sets the parameters used in generating the training sequence, such as the number of the segments in the cyclic prefix, the first symbol from which multiple consecutive symbols are generated, the number of the symbols in each training sequence, and so on. Since these modules or parts are not directly relative to the invention and one skilled in the art may arbitrarily choose and add them to the training sequence generator of the invention without departing from the spirit of the invention, these units or parts are not shown and described herein.

Please note that it is in time domain that the training symbol and sequence are described above. However, the training symbol may be also designed in frequency domain as long as the resulted training sequence in time domain meets the constraint of the invention described above. When designed in frequency domain, the training sequence generator may further include related modulation modules, for example, an IFFT module that for performs IFFT on the training symbols in frequency domain to convert the symbols to time domain.

In such case, the channel estimator may includes the corresponding demodulation modules, for example, a FFT module that performs FFT on the extracted time domain training symbols to convert the symbols to frequency domain. Since these modules are not directly related to the invention and known by those skilled in the art, the detailed description thereof is omitted. In an alternative embodiment of the invention, the modulation modules for generating the OFDM symbols from the original information symbols (for example, the IFFT module 113 in FIG. 1) are also used by the training sequence generator to perform corresponding operations on the training symbols designed in frequency domain. In an alternative embodiment, the cyclic prefix inserter 114 is also used by the training sequence generator to add cyclic prefix to the training symbols, and thus the training sequence forming unit 1162 described above may be omitted from the training sequence generator.

The effect of the invention is described below with reference to the drawings.

As described above, the training sequence may be designed in frequency domain and converted to time domain sequence through IFFT in the transmitter, and the extracted time domain training sequence is converted to frequency domain through FFT in the receiver and used in channel estimation. In the following description, the analysis is made first in case that the training sequence is designed in frequency domain.

Figure 8:
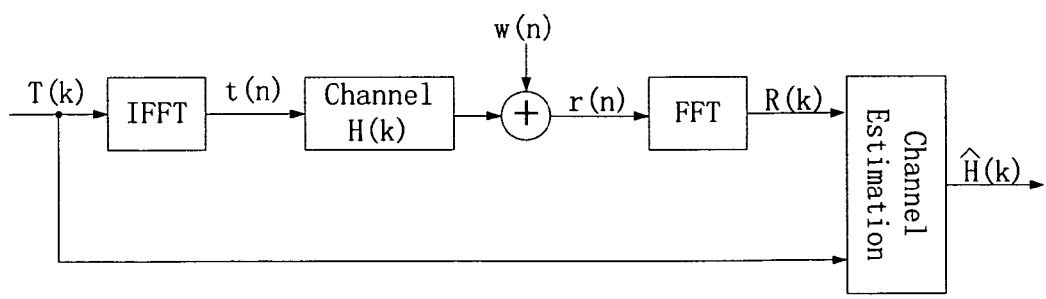
FIG. 8 is a diagram illustrating the channel estimation process with training sequence in an OFDM system.

FIG. 8 is a simplified diagram illustrating the channel estimation with frequency domain training sequence in OFDM system, where $T(k)$ denotes frequency domain training sequence, $t(n)$ denotes time domain training sequence obtained through IFFT, $r(n)$ denotes corresponding received sequences in time domain, $R(k)$ denotes corresponding received sequences in frequency domain obtained through FFT, $H(k)$ denotes real value of frequency channel response, $\hat{H}(k)$ denotes estimation result of frequency channel response, and $w(n)$ represents noise. The corresponding received sequence is recovered in frequency domain through FFT. The received sequence consists of two components, the product of transmitted sequence and frequency domain channel response, and the noise. Typical channel estimation results by LSE (Least Square Error) method are the quotient of received sequence to transmitted sequence.

With ideal synchronization in the receiver, channel estimation error is caused only by noise. Therefore, precision of channel estimation can be arbitrarily improved by increasing SNR (Signal to Noise Ratio). However, in the presence of synchronization error, ISI (Inter-Symbol Interference) arise because components belong to different OFDM symbols are involved in one FFT operation and the impacts caused by synchronization error cannot be reduced by increasing SNR.

Figure 9A:
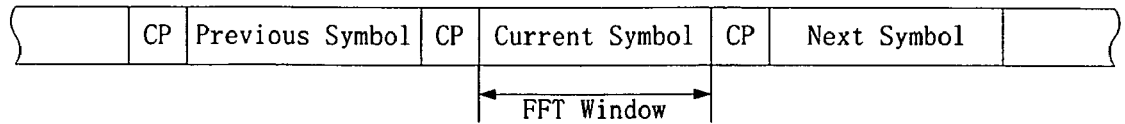
FIG. 9A is a diagram illustrating an ideal synchronization.
Figure 9B:
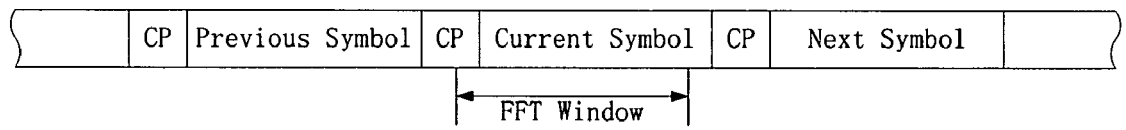
FIG. 9B is a diagram illustrating an early synchronization.
Figure 9C:
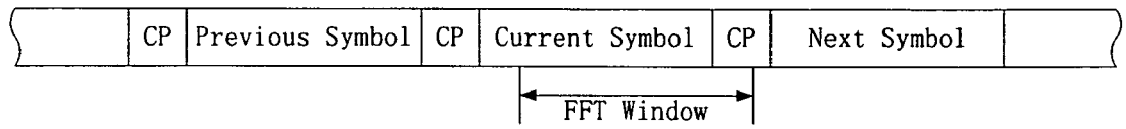
FIG. 9C is a diagram illustrating a late synchronization.

Three different kinds of synchronizations are shown in FIGS. 9A-9C. In FIGS. 9A-9C, "Previous Symbol," "Current Symbol" and "Next Symbol" are three consecutive OFDM symbols in training sequence. Each symbol has its own cyclic prefix CP for some protection of ISI. "FFT Window" indicates the time range of "Current Symbol" determined by synchronization.

FIG. 9A shows an ideal synchronization without any error, where the FFT widow exactly matches the current symbol. It can be easily proved that the estimation error when an ideal synchronization is achieved is in inverse proportion to SNR. In such situation, the estimation error can be arbitrarily reduced by increasing SNR.

However, synchronization error often exists. FIG. 9B shows an early synchronization where the FFT window starts earlier than the current symbol. In case of early synchronization, the estimation error is also in inverse proportion to SNR when the factor with unit magnitude and phase determined by the offsets between the FFT window and the current symbol is ignored.

FIG. 9C shows a late synchronization where the FFT window starts later than the current symbol. In case of late synchronization, the FFT output includes a term caused by ISI due to late synchronization, which degrades the channel estimation performance greatly. The estimation error accordingly includes a term that is independent of SNR, and therefore cannot be reduced by increasing SNR. It's clear that without special design of training sequences, estimation result of channel response with traditional training sequences involves irreducible error due to synchronization error, especially in the presence of late synchronization.

After deduction, it is found that the term caused by ISI is in relation to $$T_i(m) - e^{-j\frac{2\pi}{N}mN_{CP}} T_{i+1}(m)$$

in frequency domain, where i is the index of training symbols in frequency domain, m is the index of subcarriers, N is the number of segments in one training symbols, and $N_{CP}$ is the number of segments in the cyclic prefix of a training symbol.

It can be sent that if $$T_i(m) - e^{-j\frac{2\pi}{N}mN_{CP}} T_{i+1}(m) = 0$$

for all i and m, ISI will be eliminated irrespective of the presence of late synchronization. Thereby, precision of channel estimation can be arbitrarily improved by increasing SNR.

After an IFFT, the above constraint in frequency domain is converted to an identical constraint in time domain: $t_{i+1}(n)=t_i((n+N_{CP}) \mod N)$, where $t_i(n)$ is the $n^{th}$ segment of the $i^{th}$ training symbol, N is the number of segments contained in one training symbol, and (.)mod N indicates the modulus of N. It can be found that the training symbols generated in accordance with the embodiment described above just satisfy the constraint. That is to say, by using the training sequence generated according to the above embodiment, the ISI can be eliminated even in case of late synchronization, and the precision of the channel estimation can be arbitrarily improved by increasing SNR. Thus, robust channel estimation is achieved even if late synchronization error exists.

In addition, each training symbol in the training sequence generated according to the invention has both cyclic prefix and cyclic suffix, as described above. Thus, by using such training sequence, the ISI can be eliminated not only in case of late synchronization but also in case of early synchronization. Therefore, it is possible to perform robust channel estimation in the presence of any kind of synchronization error by using the training sequence generated according to the invention.

Another advantage of the invention lies in that the generated training sequence can be used for not only channel estimation, but also demodulation performance measurement.

As known, the traditional training sequences cannot be used for measurement of demodulation performance since symbols in traditional training sequences are quite different from modulated data symbols. Because the training symbols and data symbols are modulated with different modulation schemes, training sequences cannot be processed by data demodulator in the receiver.

It has been found that if the symbols $T_i(m)$ in the sequences are modulated data symbols, a relation $$T_{i+1}(m) - e^{j\frac{2\pi}{N}N_{CP}m} T_i(m)$$

maintains in the symbol set of the same modulation scheme for most application with the setting of $N_{CP}=N/4$ or $N_{CP}=N/2$. That is, the constraint in generating the training symbols according to the invention is maintained even the symbols are modulated data symbols of the same modulation scheme. Therefore, according to one embodiment of the invention, the training sequence is generated by using a modulated data symbol as the first training symbol. Due to the constraint designed according to the invention, all the succeeding training symbols generated will be modulated data symbols of the same modulation scheme as that of the first training symbol. Thus the training sequence keeps not only insensitiveness to synchronization error, but also consistency of the modulation scheme of each symbol. Therefore, with the training sequence generated according to this embodiment, not only the channel response can be accurately estimated but also the demodulation performance can be measured. Accordingly, the receiver according to one embodiment of the invention may further include a demodulation performance measurement unit (not shown in figures), which is configured to perform demodulation performance measurement based on the modulated training symbols designed according to the invention.

The above embodiment of the invention is described in context of a SISO OFDM system. However, the invention is also applicable to MIMO OFDM system.

Figure 10:
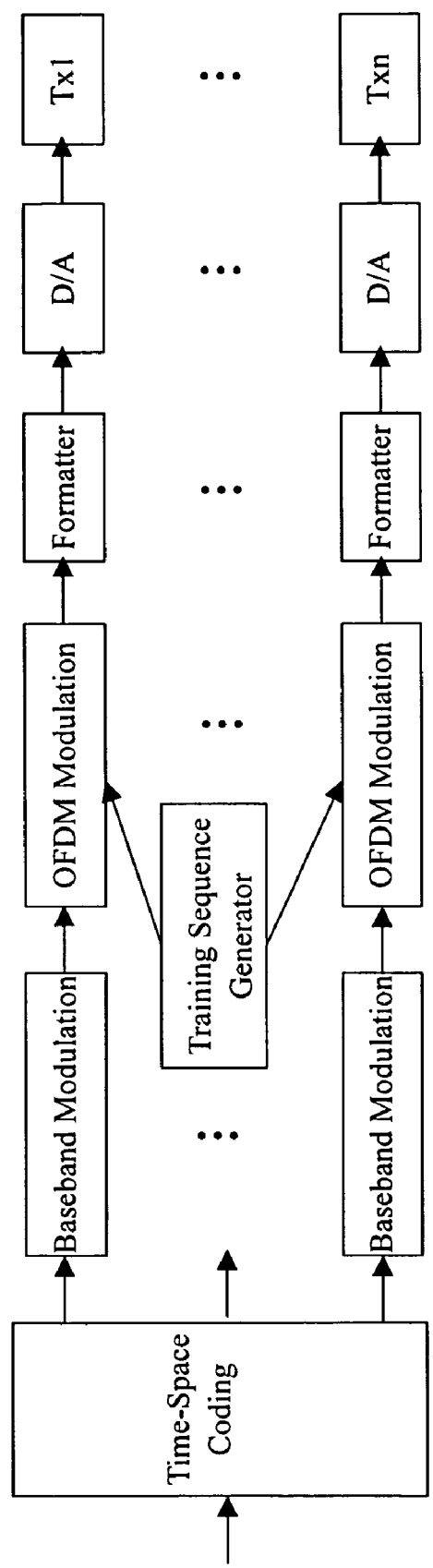
FIG. 10 is a block diagram illustrating an exemplary configuration of a transmitter in a MIMO OFDM system in accordance with one embodiment of the present invention.

FIG. 10 is a bock diagram schematically illustrating an exemplary configuration of a transmitter in a MIMO OFDM system. Rather that one transmitting antenna in the SISO OFDM system, the transmitter of MIMO OFDM system have multiple antennas Tx1, . . . , Txn, as shown in FIG. 10. The information to be sent is firstly subjected to time-space coding to generate multiple sets of signals corresponding to respective antenna. Each set of signals are processed in separate processing path for the corresponding antenna, and then transmitted from the corresponding antenna. As known in the art, the processing (baseband modulation, OFDM modulation, etc.) in each path is the same as that of SISO OFDM, and the detailed description is omitted herein.

In MIMO OFDM system, the training sequences for each antenna should be generated and the training sequences should be designed such that the sequences for different transmitter antennas are orthogonal to each other. An example of traditional training sequences for MIMO OFDM system with four transmitter antennas are shown in FIG. 11.

Figures 11, 12:
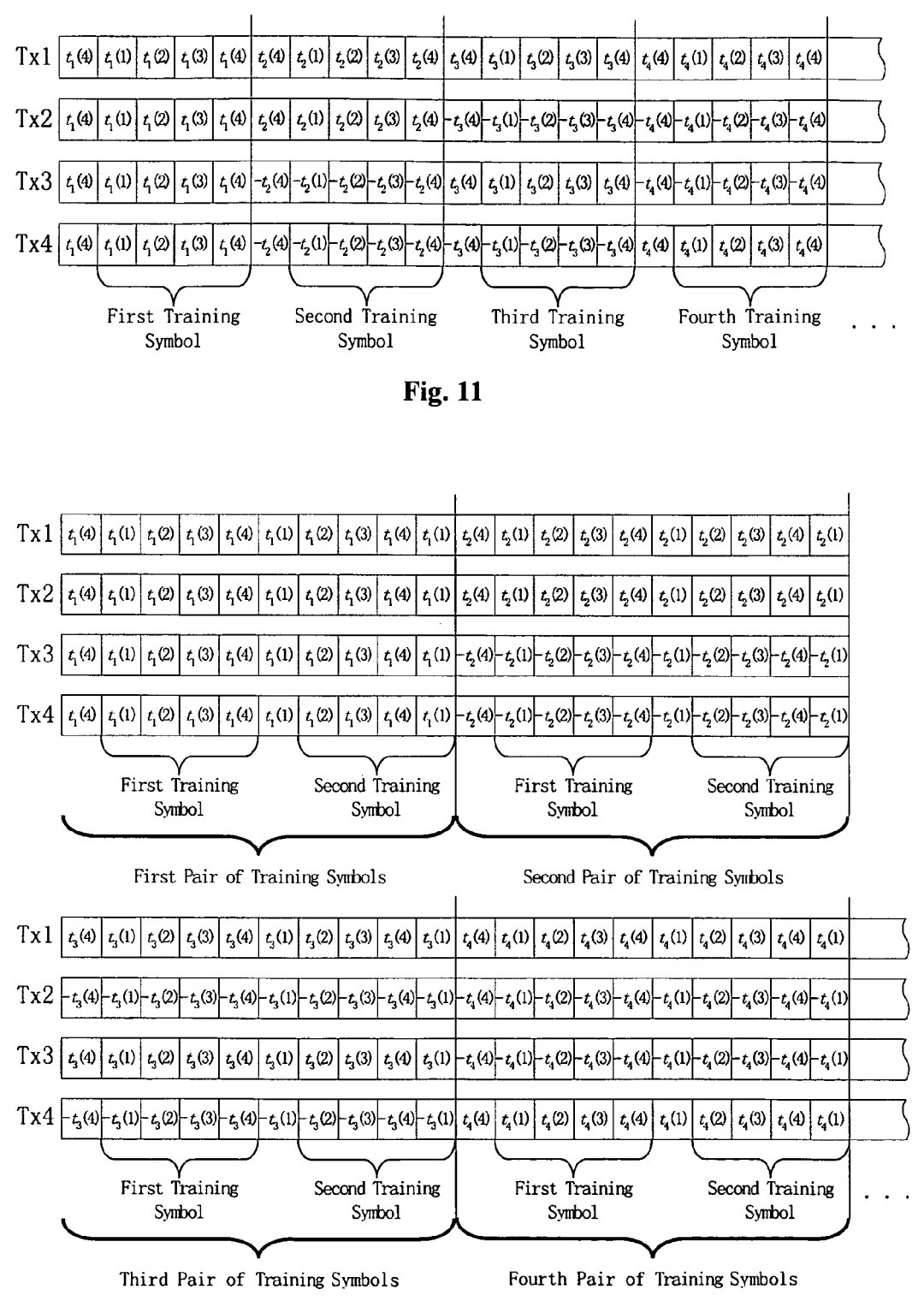

In FIG. 11, $t_i(j)$ indicates the $j^{th}$ segment of the $i^{th}$ training symbol of the training sequence, and Tx1, Tx2, Tx3 and Tx4 indicate the four transmitter antennas respectively. The training sequences designed for different antennas are orthogonal to each other. However, in the traditional training sequences, the constraint of cyclic shift between consecutive symbols is not satisfied. Such sequences are sensitive to synchronization error, especially to late synchronization, and therefore cannot be used to provide accurate channel estimation.

In accordance with one embodiment of the invention, each training symbol in the traditional training sequences is replaced by a pair of training symbols which satisfy the constraint designed according to the invention. FIG. 12 shows an example of training sequences generated according to the embodiment of the invention.

As shown in FIG. 12, each training symbol in the traditional training sequence shown in FIG. 11 is replaced by a pair of training symbols in which the second one of the pair is the cyclic left shift version of the first one. That is, each pair of training symbols in the training sequences satisfy the constraint described above. Therefore, the training sequences are insensitive to synchronization error. On the other hand, the first one of each pair of symbols shown in FIG. 12 is the same as the corresponding one in the traditional training sequences shown in FIG. 11. Therefore, the training sequences for different antennas generated in accordance with the embodiment are also orthogonal to each other. Such sequences can be used to identify channels between different transmitter antennas and a single receiver since the orthogonality between different sequences is reserved.

It is also noted that in the training sequences shown in FIG. 12, the cyclic prefix of the second symbol in each pair of training symbols is just the cyclic suffix of the first training symbol. For example, the second pair of training symbols transmitted through the first antenna Tx1 is ($t_2(4), t_2(1), t_2(2), t_2(3), t_2(4), t_2(1), t_2(2), t_2(3), t_2(4), t_2(1)$). It can be seen that the first training symbol ($t_2(1), t_2(2), t_2(3), t_2(4)$) has a cyclic prefix $t_2(4)$, and that the second training symbol ($t_2(2), t_2(3), t_2(4), t_2(1)$) has a cyclic prefix $t_2(1)$, which is also the cyclic suffix of the first training symbol. Thus, the ISI in case of early synchronization is also well reduced.

Therefore, the training sequences generated according this embodiment of the invention can be used in MIMO OFDM system for robust channel estimation in the presence of any kind of synchronization error. Since the first training symbol of each pair of training symbols in the training sequence according to the invention can be the same as the corresponding symbol in the traditional training sequence, all estimation methods that can work with traditional training sequences can be used in the receiver with the first received training symbol in each pair of training symbols. Also, the training sequences can be inserted in the preamble field or the payload field of frames, and demodulation performance measurement can be realized if the training sequences are generated by modulated data symbols.

In the above embodiment, each training sequence for the respective antenna is formed by multiple pairs of training symbols. However, the invention is not limited to this particular embodiment. For example, each training sequence for the respective antenna may contain multiple groups of training symbols, and each group of training symbols may contain more than two training symbols that satisfy the constraint designed according to the invention, as long as each sequence, taken as a whole, is orthogonal to the sequences for other antennas.

It can bee seen from the above description, robust channel estimation which is insensitive to synchronization error can be performed in both SISO OFDM and MIMO OFDM communication systems with the invention. There are still many advantages of the invention compared with traditional solutions. For example, no modification of the frame format is required, which means the invention can be applied in any communication system based on a standard of SISO/MIMO OFDM transmission. When the training symbols are generated by modulated symbols, it is possible to perform both demodulation performance measurement and channel estimation by using the same set of training sequences to increase efficiency. And, there is no limitation on the algorithms of channel estimation, which means almost all the typical algorithms known in the art can be employed.

Experiments are conducted in a MIMO OFDM system. FIG. 13A illustrates the constellation of the transmitted symbols, FIG. 13B illustrates the received symbols in case that the channel estimation is performed by using the traditional training sequences and in presence of late synchronization, and FIG. 13C illustrates the received symbols in case that the channel estimation is performed by using the training sequences as shown in FIG. 12 and in presence of late synchronization. As can be seen from the figures, the demodulation performance is greatly improved by the invention since there is no ISI in demodulation.

FIG. 14 illustrates the real channel response between one transmitter antenna and one receiver antenna in a MIMO OFDM system with two transmitter antennas and two receiver antennas and corresponding estimation results in the presence of late synchronization. The horizontal axis represents the index of subcarriers and the vertical axis represents the magnitude of frequency channel response. It is very clear that the estimation result obtained by using the training sequences containing pair symbols according to the invention is very close to real channel value, while the result obtained by using the traditional training sequences containing single symbols has large error cause by ISI.

Figure 15:
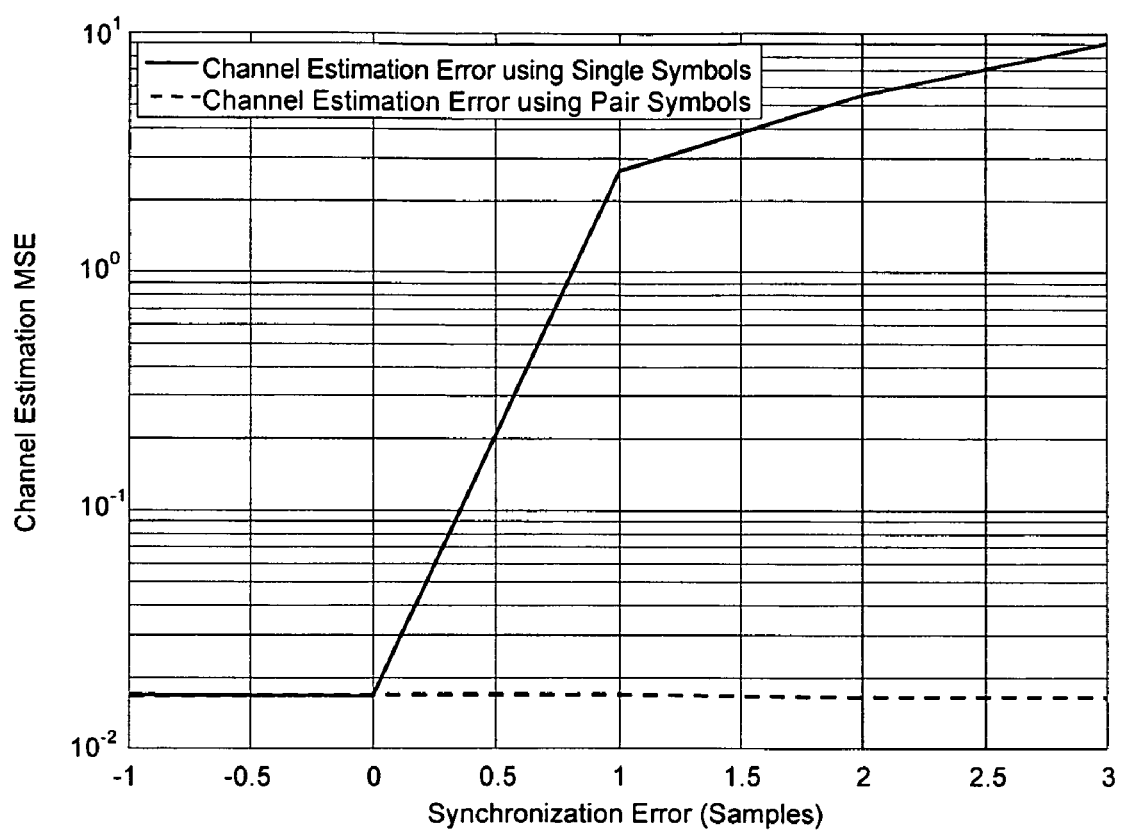
FIG. 15 is a diagram illustrating the impact of synchronization error on channel estimation.

The impact of synchronization error on channel estimation is plotted as a function of synchronization error in FIG. 15. The horizontal axis represents the synchronization error in number of time domain samples between estimated starting time of symbols and real starting time. Vertical axis shows the mean square error of channel estimation. In horizontal axis, "0" means ideal synchronization, negative value means early synchronization and positive value means late synchronization. There is a sharp increase of the channel estimation error due to occurrence of late synchronization when using the traditional training sequences containing single symbols, while the error of estimation results using the training sequences containing pair symbols according to the invention has no change among the whole horizontal axis. This fact demonstrates that the training sequences generated according to the invention can provide accurate channel estimation results in the presence of all kinds of synchronization error.

Please also note that the blocks shown in each configuration block diagram are not necessarily concrete devices. The blocks are divided by functions thereof, and may be embodied in a single device or several devices. That is, the function of each unit may be performed by several different devices or the functions of several units may be performed by one single device. Further, the function may be performed in any distributed fashion. For example, if the training symbol generator generates the training symbols in frequency domain, the IFFT process may be performed by a separate IFFT unit in the training sequence generator or the original IFFT unit of the transmitter. Also, the training symbols may be combined with data symbols in the frame before being added the cyclic prefixes, and then be subjected to the cyclic prefix insertion together with other portion of the frame. One skilled in the art may construct any particular topology of the transmitter as long as the training sequences generated eventually satisfy the constraint designed according to the invention.

The particular embodiments of the invention are described above in context of a SISO OFDM system or a MIMO OFDM system. However, as will be realized by those skilled in the art, the invention can be applied in any other communication system in which training sequences are used.

It should also be noted that the constraint described in the above embodiments of the invention is designed from the idea of eliminating ISI from the output of the FFT window. However, other sequences can be designed and generated such that the sequences satisfy the requirements of being insensitive to synchronization error. After reading the description, those skilled in the art may modify the constraint described above without departing from the spirit of the invention.

The elements of the invention may be implemented in hardware, software, firmware or a combination thereof and utilized in systems, subsystems, components or sub-components thereof. When implemented in software, the elements of the invention are programs or the code segments used to perform the necessary tasks. The program or code segments can be stored in a machine-readable medium or transmitted by a data signal embodied in a carrier wave over a transmission medium or communication link. The "machine readable medium" may include any medium that can store or transfer information. Examples of a machine readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, etc. The code segments may be downloaded via computer networks such as the Internet, Intranet, etc.

The particular embodiments according to the invention have been described above with reference to the drawings. However, the invention is not limited by the particular configurations and processes shown in the drawings. The invention may be embodied in other specific forms without departing from the spirit or essential characteristics thereof. For example, the training sequences described in the specific embodiment may be modified as long as they satisfy the constraint designed according to the invention. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An apparatus for achieving robust channel estimation in a communication system, comprising:
   (A) a training sequence generator to generate a training sequence, wherein the training sequence generator further comprises
      (I) a training symbol generator to generate a plurality of training symbols satisfying a predetermined constraint such that the training symbols are insensitive to synchronization error, wherein the training symbol generator further comprises a cyclic left shifter to perform cyclic left shift on a current training symbol in time domain to generate a next training symbol with the amount of the shifting determined by the number of segments in a cyclic prefix to be added to each training symbol; and
      (II) a training sequence forming unit configured to form the training sequence from the training symbols generated by the training symbol generator;
   (B) a formatter to insert the training sequence into a frame; and
   (C) a transmitting module to transmit the frame.

2. The apparatus according to claim 1, wherein the training sequence forming unit is configured to add a cyclic prefix to each training symbol, and concatenate the plurality of training symbols added with the cyclic prefixes.

3. The apparatus according to claim 1, wherein the formatter is configured to insert the training sequence into a preamble field of the frame.

4. The apparatus according to claim 1, wherein the formatter is configured to insert the training sequence into a payload field of the frame.

5. The apparatus according to claim 1, wherein the communication system is a Multiple Input Multiple Output (MIMO) Orthogonal Frequency Division Multiplexing (OFDM) system, and the transmitting module comprises multiple antennas; and wherein
   the training symbol generator is further configured to generate multiple groups of the plurality of training symbols for each antenna;
   the training sequence forming unit is further configured to form multiple training sequences that are orthogonal to each other, each training sequence corresponding to a respective antenna and containing the multiple groups of the plurality of training symbols for the respective antenna;
   the frame forming unit is further configured to insert each training sequence into a frame to be transmitted from the respective antenna; and
   the transmitting module is configured to transmit each frame from the respective antenna.

6. A communication method for archiving robust channel estimation in a communication system, comprising:
   generating a plurality of training symbols satisfying a predetermined constraint such that the training symbols are insensitive to synchronization error, wherein generating a plurality of training symbols further comprises performing cyclic left shift on a current training symbol in time domain to generate a next training symbol with the amount of the shifting is determined by the number of segments in a cyclic prefix to be added to each training symbol;
   forming a training sequence from the plurality of training symbols;
   inserting the training sequence into a frame; and
   transmitting the frame.

7. The method according to claim 6, wherein forming a training sequence further comprises adding a cyclic prefix to each training symbol, and concatenating the plurality of training symbols added with the cyclic prefixes.

8. The communication method according to claim 6, wherein the training sequence is inserted into a preamble field of the frame.

9. The communication method according to claim 6, wherein the training sequence is inserted into a payload field of the frame.

10. The communication method according to claim 7, further comprising:
   receiving the frame;
   extracting the training sequence from the received frame;
   extracting the training symbols from the training sequence by taking a cyclic suffix of a training symbol as a cyclic prefix of a next training symbol in the training sequence; and
   performing channel estimation based on the training symbols.

* * * * *